United States Patent [19]
Schmerling

[11] 3,853,956
[45] Dec. 10, 1974

[54] REACTION OF PHENOLS WITH OLEFINS AND CUPRIC HALIDE

[75] Inventor: Louis Schmerling, Riverside, Ill.

[73] Assignee: Universal Oil Products Company, Des Plaines, Ill.

[22] Filed: Mar. 20, 1969

[21] Appl. No.: 808,981

[52] U.S. Cl....... 260/473 S, 260/521 H, 260/521 B, 260/612 R, 260/612 D, 260/619 R, 260/619 D, 260/619 F, 260/623 R, 260/623 H, 260/624 C, 260/625, 260/626 R, 260/626 T
[51] Int. Cl............................................ C07c 65/12
[58] Field of Search........ 260/474, 624, 521, 612 R, 260/612 D, 619 D, 621 R, 626 R, 626 T, 624 C, 473 R, 396 R, 623 R, 623 H, 671 C, 521 B, 521 H, 473 S

[56] References Cited
UNITED STATES PATENTS

| | | | |
|---|---|---|---|
| 2,091,565 | 8/1937 | Perkins et al. | 260/624 |
| 2,186,022 | 1/1940 | Holm et al. | 260/671 C X |
| 2,793,239 | 5/1957 | Toland | 260/671 |
| 2,923,745 | 2/1960 | Buls | 260/624 |

FOREIGN PATENTS OR APPLICATIONS
1,091,083   10/1964   Great Britain

OTHER PUBLICATIONS
Mel'kanovitskaya, C.A. 70, 19716e, (1969).
Velling et al., Chem. Abst., 70, 37457a, (1969).

Primary Examiner—Lorraine A. Weinberger
Assistant Examiner—John F. Terapane
Attorney, Agent, or Firm—James R. Hoatson, Jr.; Raymond H. Nelson

[57] ABSTRACT

Phenolic compounds are treated with olefinic hydrocarbons in the presence of a catalyst comprising a higher valent halide of a polyvalent metal at elevated temperatures to prepare O-alkylated, C-alkylated, and halogenated phenols.

6 Claims, No Drawings

REACTION OF PHENOLS WITH OLEFINS AND CUPRIC HALIDE

This invention relates to a process for the treatment of phenolic compounds with olefinic hydrocarbons. More specifically, the invention is concerned with the reaction of a phenolic compound with an olefinic compound, and particularly an olefinic hydrocarbon, in the presence of a catalyst comprising a metal halide of the type hereinafter set forth in greater detail to prepare certain compounds.

The C-alkylated phenols, the O-alkylated phenols, and the halogenated phenols which constitute the desired products which are prepared according to the process of this invention will find a wide variety of uses in the chemical field. For example, the O-alkylated phenols or phenyl ethers which constitute one of the products obtained may be used as solvents, the various alkyl aryl ethers possessing solvent properties for other chemical compounds such as fats, oils, resins, waxes, gums, alkaloids, etc. The halogenated phenols which constitute other products of this invention may also be used in the chemical field. A specific example of this is p-chlorophenol which may be used as an intermediate in the synthesis of dyes and drugs, as a denaturant for alcohols, or as a selective solvent in refining mineral oils. The other product which results from the process of this invention, namely, C-alkylated phenols may be exemplified by butylphenol. This particular compound may be used as a chemical intermediate for synthetic resins, plasticizers, surface-active agents, perfumes, antioxidants, pour-point depressors, as an emulsion breaker for petroleum oil and some plastics, as a synthetic lubricant, etc.

It is therefore an object of this invention to provide a process for the treatment of a phenol compound.

A further object of this invention is to provide a process for the reaction of a phenolic compound with an olefinic compound in the presence of certain catalysts to prepare the desired products.

In one aspect, an embodiment of this invention is found in a process for the preparation of O-alkylated, C-alkylated, and halogenated phenols which comprises reacting an olefinic hydrocarbon with a phenolic compound at reaction conditions in the presence of a catalyst comprising a higher valent halide of a polyvalent metal, and recovering the resultant products.

A specific embodiment of this invention is found in a process for the preparation of O-alkylated, C-alkylated, and halogenated phenols which comprises reacting propene with phenol in the presence of a catalyst comprising cupric chloride at a temperature in the range of from about 100° to about 300°C. and a pressure in the range of from about atmospheric to about 100 atmospheres, recovering the resultant isopropylphenols, isopropyl phenyl ether, and chlorophenols.

Other objects and embodiments will be found in the following further detailed description of the present invention.

As hereinbefore set forth, the present invention is concerned with a process for the treatment of phenolic compounds with an olefinic compound, and particularly an olefinic hydrocarbon compound, in the presence of certain catalytic compositions of matter to prepare O-alkylated, C-alkylated, and halogenated phenols. The term "phenolic compound" as used in the present specification and appended claims will refer to unsubstituted and substituted nuclear hydroxy-containing aromatic compounds, both monohydroxy and polyhydroxy in nature, said reaction being effected at reaction conditions hereinafter set forth in greater detail. The catalytical compositions of matter which are used to promote the reaction will comprise the higher valent halides of polyvalent metal halides. These polyvalent metal halides may be characterized as being either weak, totally inactive, or non-Friedel-Crafts-type metal halides in which the metal possesses at least two separate and distinct valences. Some specific examples of these higher valent halides of a polyvalent metal will include cupric chloride, cupric bromide, cupric fluoride, mercuric chloride, mercuric bromide, mercuric fluoride, stannic chloride, stannic bromide, stannic fluoride, cobaltic chloride, cobaltic bromide, cobaltic fluoride, molybdenum trichloride, molybdenum tribromide, molybdenum trifluoride, molybdenum tetrachloride, molybdenum tetrabromide, molybdenum tetrafluoride, molybdenum pentachloride, molybdenum pentabromide, molybdenum pentafluoride, manganese trichloride, manganese tribromide, manganese trifluoride, chromic chloride, chromic bromide, chromic fluoride, etc. Of the aforementioned catalysts, the preferred reaction promoter comprises cupric chloride or cupric bromide.

The reaction conditions under which the process of the present invention is effected will include elevated temperatures in the range of from about 100° to about 300°C. and preferably in the range of from about 150° to about 250°C. In the preferred embodiment of the invention the reaction is effected at atmospheric pressures. However, it is also contemplated that the reaction may be effected at elevated pressures ranging from about 2 to about 100 atmospheres, especially when utilizing reaction temperatures which will lie in the upper portion of the temperature range hereinbefore set forth. When utilizing these superatmospheric pressures, the pressure is produced autogenously or by charging a substantially inert gas such as nitrogen into the reaction zone, the amount of pressure which is used being that which is sufficient to maintain a major portion of the reactants in the liquid phase.

The phenolic compounds which comprise one of the starting materials of the present process include both unsubstituted and substituted hydroxy aromatic compounds. Specific examples of these phenolic compounds include phenol, o-cresol, m-cresol, p-cresol, o-ethylphenol, m-ethylphenol, p-ethylphenol, o-propylphenol, m-propylphenol, p-propylphenol, o-butylphenol, m-butylphenol, p-butylphenol, etc.; polyhydroxy benzenes such as catechol, resorcinol, hydroquinone, pyrogallol, hydroxyhydroquinone, phloroglucinol, etc.; o-hydroxybenzoic acid (salicylic acid), m-hydroxybenzoic acid, p-hydroxybenzoic acid, etc.; 1-hydroxnaphthalene, 2-hydroxynaphthalene, 1,2-dihydroxynaphthalene, 1,4-dihydroxynaphthalene, 1-hydroxy-2-methylnaphthalene, 1-hydroxy-4-methylnaphthalene, 1-hydroxyanthracene, 2-hydroxyanthracene, 1,2-dihydroxyanthracene, 1,4-dihydroxyanthracene, 1-hydroxy-2-methylanthracene, 1-hydroxy-4-methylanthracene, 1-hydroxyphenanthrene, 2-hydroxyphenanthrene, 1,2-dihydroxyphenanthrene, 1,4-dihydroxyphenanthrene, 1-hydroxy-2-methylphenanthrene, 1-hydroxy-4-methylphenanthrene, 1-hydroxychrysene, 2-hydroxychrysene, 1,2-dihydroxychrysene, 1,4-dihydroxychrysene, 1-hydroxy-2-methylchrysene, 1-hydroxy-4-methylchrysene, 1-hydroxyprene, 2-hydroxypyrene, 1,2-dihydroxypyrene, 1,4-dihydroxypyrene, 1-hydroxy-2-methylpyrene, 1-hydroxy-4-methylpyrene, etc.

It is also contemplated within the scope of this invention that phenolic compounds which may contain other substituents on the ring such as nitro, amino, cyano, etc. radicals may also be treated with an olefin, however, not necessarily with equivalent results.

Olefinic compounds, and particularly olefinic hydrocarbons, which may be reacted with the aforementioned phenolic compounds are those which contain from 2 up to about 20 carbon atoms such as alkenes including ethylene, propylene, 1-butene, 2-butene, 1-pentene, 2-pentene, 3-pentene, 1-hexene, 2-hexene, 3-hexene, the isomeric heptenes, octenes, nonenes, decenes, undecenes, dodecenes, tridecenes, tetradecenes, pentadecenes, hexadecenes, heptadecenes, octadecenes, nonadecenes, eicosenes, etc.; cycloalkenes including cyclopentene, cyclohexene, cycloheptene, etc.; aralkenes including vinylbenzene, allylbenzene, methallylbenzene, crotonylbenzene, etc.

The process of this invention may be effected in any suitable manner and may comprise either a batch or a continuous type operation. For example, when a batch type operation is used, a quantity of the phenolic compound is placed in an appropriate reaction apparatus. The apparatus may comprise a flask provided with heating, stirring, and refluxing means or it may comprise an autoclave of the rotating or stirring type. The reaction flask will also contain a catalyst of the type hereinbefore set forth in greater detail. Following this the olefinic hydrocarbon is charged to the reaction vessel in either gaseous or liquid form. The reaction mixture is then heated to the desired operating temperature, and allowed to proceed at this temperature for a predetermined residential time which may range from about 0.5 up to about 10 hours or more in duration. In the event that superatmospheric pressures are to be employed in the reaction, these pressures may be provided for from the charge of an olefinic hydrocarbon, if in gaseous form, or by the introduction of a substantially inert gas such as nitrogen into the reaction zone. Upon completion of the desired residence time, the vessel and contents thereof are allowed to cool to room temperature, the excess pressure, if any, is discharged and the reaction mixture is recovered. The mixture is separated from the catalyst by filtration, purification, and recovery, said means including treatment with a substantially inert organic solvent for washing, drying, fractional crystallization, fractional distillation, etc. whereby the untreated material is separated from the various reaction products which, as hereinbefore set forth, are O-alkylated, C-alkylated, and halogenated phenols.

It is also contemplated within the scope of this invention that the process may be effected in a continuous manner of operation. When such a type of operation is used, a reaction vessel is provided with a catalyst comprising a higher valent halide of a polyvalent metal and is maintained at the proper operating conditions of temperature and pressure. The reactants comprising the phenolic compound and the olefinic hydrocarbon of the type hereinbefore set forth in greater detail are continuously charged to the reactor through separate lines or, if so desired, the reactions may be admixed prior to entry into said reactor and charged thereto in a single stream. Upon completion of a desired residence time, the reactor effluent is continuously withdrawn from said reactor and subjected to separation means whereby the desired reaction products comprising O-alkylated phenols, C-alkylated phenols, and halogenated phenols are separated from the unreacted starting materials, the latter being recycled to the reactor to form a portion of the feed stock.

Inasmuch as the catalyst which is used in the reactor is in solid form, one particular continuous type of operation which may be used comprises a fixed bed type of operation in which the catalyst is deposited in the reactor as a fixed bed while the starting materials comprising the phenolic compound and the olefinic hydrocarbon pass through the catalyst bed in either an upward or a downward flow.

Another type of operation which may be utilized comprises the moving bed type of operation in which the catalyst bed and the reactants pass through the reaction zone either concurrently or countercurrently to each other.

Yet another type of continuous operation may be used which comprises a slurry operation in which the catalyst is carried into the reaction zone as a slurry in either or both of the reactants.

Some specific examples of the type of products which may be obtained when utilizing the process hereinbefore set forth include o-ethylphenol, m-ethylphenol, p-ethylphenol, ethyl phenyl ether, o-isopropylphenol, m-isopropylphenol, p-isopropylphenol, isopropyl phenyl ether, o-sec-butylphenol, m-sec-butylphenol, p-sec-butylphenol, sec-butyl phenyl ether, o-cyclopentalphenol, m-cyclopentalphenol, p-cyclopentalphenol, cyclopental phenyl ether, o-cyclohexylphenol, m-cyclohexylphenol, p-cyclohexylphenol, cyclohexyl phenyl ether, 2-isopropyl-p-cresol, 3-isopropyl-p-cresol, p-isopropyl tolyl ether, isopropylhydroquinone, p-isopropylhydroxyphenyl ether, isopropylsalicylic acid, isopropyl-o-carboxyphenyl ether, o-chlorophenol, m-chlorophenol, p-chlorophenol, o-bromophenol, m-bromophenol, p-bromophenol, 2-chloro-p-cresol, 3-chloro-p-cresol, 2-bromo-p-cresol, 3-bromo-p-cresol, chlorohydroquinone, bromohydroquinone, chlorosalicyclic acid, bromosalicyclic acid, etc. It is to be understood that the aforementioned compounds are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example 65 g. (0.69 mole) of phenol along with 53 g. (0.30 mole) of cupric chloride were placed in the glass liner of a rotating autoclave. The autoclave was sealed and 50 g. (1.2 moles) of propene was pressed in. The initial pressure in the autoclave was 4 atmospheres. Following this the autoclave was heated to a temperature of 200°C. and maintained thereat for a period of 8 hours, the pressure reaching a maximum of 40 atmospheres at this temperature. At the end of the 8-hour period, the autoclave and contents thereof were allowed to return to room temperature, the final pressure at room temperature being 1 atmosphere. The autoclave was opened and 106 g. of a liquid product along with 37 g. of the catalyst (now chiefly cuprous chloride) were recovered. The product was separated from the catalyst and subjected to various analyses such as a gas-liquid-chromatographic separation and analysis, nuclear-magnetic resonance analysis, and infra-red analysis. The products were found to comprise o-chlorophenol, p-chlorophenol, o-isopropylphenol, p-isopropylphenol, and isopropyl phenyl ether.

EXAMPLE II

To an autoclave containing 51 g. (0.38 mole) of cupric chloride and 76 g. (0.70 mole) of m-cresol was charged 50 g. (1.2 moles) of propene. The initial pressure was 4 atmospheres at room temperature. The autoclave was then heated to a temperature of 200°C. and maintained at that temperature for a period of 4 hours, the pressure rising to a maximum of 34 atmospheres at this temperature. Upon completion of the 4-hour residence time, the autoclave and contents thereof were allowed to return to room temperature, the final pressure at room temperature dropping to 4 atmospheres. The excess pressure was discharged, the autoclave was opened, and 109 g. of a liquid product along with 34 g. of the catalyst were recovered. The liquid was analyzed utilizing the method set forth in Example I above and was found to contain a mixture of isopropyl-m-cresols, diisopropyl-m-cresols, chloro-m-cresols, isopropyl m-tolyl ether, and isopropyl mono- and diisopropyl-m-tolyl ethers.

EXAMPLE III

In this example 61 g. (0.44 mole) of salicylic acid and 56 g. (0.42 mole) of cupric chloride were placed in the glass liner of a rotating autoclave. The autoclave was sealed and 50 g. (1.2 moles) of propene was pressed in until an initial pressure of 4 atmospheres was reached. The autoclave was then heated to a temperature of 200°C. and maintained thereat for a period of 4 hours, the pressure reaching a maximum of 55 atmospheres at that time. At the end of the 4 hours, the autoclave and contents thereof were allowed to return to room temperature. The autoclave was opened, and the product subjected to various analyses of the type hereinbefore set forth in Example I above. These analyses disclosed the presence of isopropylsalicylic acids, chlorosalicylic acids, isopropyl isopropylsalicylate, isopropyl chlorosalicylate, and isopropyl phenyl ether plus isopropyl chlorophenyl ether formed via decarboxylation of the salicylic acid or its reaction products.

EXAMPLE IV

In this example 66 g. (0.70 mole) of phenol and 53 g. (0.39 mole) of cupric chloride are placed in the glass liner of a rotating autoclave and thereafter 98 g. (1.2 moles) of cyclohexene are added thereto. The autoclave is sealed and heated to a temperature of 200°C. for a period of 8 hours. At the end of this time, the autoclave is allowed to return to room temperature and a liquid product is recovered after separation from the catalyst. Analysis of the product by means of a gas-liquid-chromatograph discloses the presence of a mixture of cyclohexylphenols, chlorophenols, and cyclohexyl phenyl ether.

EXAMPLE V

A mixture of 88 g. (0.80 mole) of hydroquinone and 51 g. (0.38 mole) of cupric chloride is placed in the glass liner of a rotating autoclave. The autoclave is sealed and 50 g. (1.2 moles) of propene is pressed in until an initial pressure of 4 atmospheres is reached. The autoclave is then heated to a temperature of 200°C. and maintained thereat for a period of 8 hours. At the end of this time, the autoclave and contents thereof are allowed to return to room temperature, the excess pressure is vented, and the reaction products along with the catalyst are recovered. The liquid product is separated from the catalyst and subjected to various analyses including infra-red, nuclear-magnetic resonance, and liquid-gas chromatography. These various analyses will disclose the presence of isopropylhydroquinone, chlorohydroquinone, and isopropyl p-hydroxyphenyl ether.

I claim as my invention:

1. The preparation of O-alkylated, C-alkylated, and halogenated phenols by reacting a phenolic compound with an unsaturated hydrocarbon selected from the group consisting of monoalkenes, cyclomonoalkenes and arylmonoalkenes of from 2 to about 20 carbon atoms in the presence of cupric halide in solid form at a temperature in the range of from about 100° to about 300°C. and a pressure in the range of from atmospheric to about 100 atmospheres, and recovering the resultant products.

2. The process as set forth in claim 1 in which said hydrocarbon is propene, said phenolic compound is phenol.

3. The process as set forth in claim 1 in which said hydrocarbon is cyclohexene, said phenolic compound is phenol.

4. The process as set forth in claim 1 in which said hydrocarbon is propene, said phenolic compound is m-cresol.

5. The process as set forth in claim 1 in which said hydrocarbon is propene, said phenolic compound is hydroquinone.

6. The process as set forth in claim 1 in which said hydrocarbon is propene, said phenolic compound is salicylic acid.

* * * * *